United States Patent
Myers

(10) Patent No.: US 7,610,740 B2
(45) Date of Patent: Nov. 3, 2009

(54) HOLDER FOR LAWNMOWER BLADES

(76) Inventor: Eric David Myers, 8505 Yashuntafun Rd., Tallahassee, FL (US) 32311

( * ) Notice: Subject to any disclaimer, the term of this patent is extended or adjusted under 35 U.S.C. 154(b) by 0 days.

(21) Appl. No.: 11/975,832

(22) Filed: Oct. 22, 2007

(65) Prior Publication Data

US 2009/0100819 A1 Apr. 23, 2009

(51) Int. Cl.
A01D 34/00 (2006.01)

(52) U.S. Cl. ...................................................... 56/17.5

(58) Field of Classification Search ................ 56/17.5, 56/295, 255, 256, 289, DIG. 17, 20; 172/15; 30/347; D15/11, 17, 21, 28, 29

See application file for complete search history.

(56) References Cited

U.S. PATENT DOCUMENTS

| 1,744,597 | A |   | 1/1930  | Vasconcellos |           |
|-----------|---|---|---------|--------------|-----------|
| 2,870,616 | A | * | 1/1959  | Benson       | 464/99    |
| 2,976,666 | A | * | 3/1961  | Machovec     | 56/295    |
| 3,247,656 | A |   | 4/1966  | Phelps       |           |
| 3,343,350 | A |   | 9/1967  | Freedlander et al. | |
| 3,545,189 | A | * | 12/1970 | Houle et al. | 56/295    |
| 3,877,146 | A | * | 4/1975  | Pittinger    | 30/276    |
| 3,910,017 | A | * | 10/1975 | Thorud et al. | 56/295   |
| 4,083,166 | A | * | 4/1978  | Haas         | 56/13.7   |
| 4,213,289 | A | * | 7/1980  | Kamppinen    | 56/295    |
| 4,292,791 | A |   | 10/1981 | Lalonde      |           |
| 5,109,656 | A |   | 5/1992  | Zimmer       |           |
| 5,209,052 | A |   | 5/1993  | Carroll      |           |
| 5,373,687 | A |   | 12/1994 | Secord       |           |
| 5,724,796 | A | * | 3/1998  | Plamper      | 56/17.5   |
| 5,890,354 | A | * | 4/1999  | Bednar       | 56/320.1  |
| 6,179,059 | B1 | * | 1/2001 | Notaras et al. | 172/17  |
| 6,367,235 | B1 | * | 4/2002 | Moynihan     | 56/17.5   |
| 6,688,095 | B2 | * | 2/2004 | Wadzinski    | 56/255    |
| 7,155,889 | B2 |   | 1/2007 | Myers        |           |
| D566,731  | S  | * | 4/2008 | Myers        | D15/17    |
| 2007/0074497 | A1 | * | 4/2007 | Myers     | 56/17.5   |

* cited by examiner

Primary Examiner—Árpád Fábián-Kovács
(74) Attorney, Agent, or Firm—J. Wiley Horton

(57) ABSTRACT

A cutting blade assembly incorporating two lawnmower cutting blades and a holder configured to hold the lawnmower cutting blades in perpendicular orientation with respect to each other. The holder does not occupy any space on the lawnmower blade mounting shaft and results in less rotational inertia than conventional mounting hub designs.

9 Claims, 4 Drawing Sheets

HOLDER FOR LAWNMOWER BLADES

BACKGROUND OF THE INVENTION

1. Field of the Invention

This invention relates to the field of lawnmowers. More specifically, the invention comprises a lawnmower blade assembly which can be attached to a conventional lawnmower shaft.

2. Description of the Related Art

The overall design of the gas-powered and electric-powered lawnmower cutting system has remained unchanged in recent decades. The overall design uses an electric or gas motor to turn a shaft which extends in the direction of the ground beneath the motor. The shaft extends through a hole into the blade housing where a blade is attached to the shaft. The motor drives the shaft causing angular rotation of the blade within the housing. Grass that extends above the height of the blade is cut and discharged from the housing.

Various lawnmower replacement blades are known in the art. The designs of the replacements blades vary significantly and have been the subject of many U.S. patents. Although great efforts have been made to improve the design of replacement lawnmower blades, these designs have their shortcomings.

As an example, most commercially available blades are ineffective at neatly cutting grass when the grass is wet, tall, or thick. The rotation of a conventional blade slows down under these conditions as the lawn provides greater resistance to cutting. This resistance can often escalate as the rotation of the cutting blade continues to slow until the blade eventually stops. The escalation of resistance occurs because, as the blade slows down, the force at which the cut grass is ejected decreases. This results in the accumulation of cut grass in the housing which increases the force required to turn the blade.

Even under ideal cutting conditions, conventional blades are ineffective at "cutting" the grass. As a conventional blade begins to dull, more grass is "torn" than "cut." As the blade strikes the grass, some of the grass is pulled by the blade until it breaks. This "tearing" of the grass results in increased cellular damage to the grass. This often causes the tip of the blade of grass to appear brown. It has also been noted that the increased cellular damage causes the grass to grow more quickly which requires more frequent mowing.

In order to address these disadvantages, some have proposed mounting two or more cutting blades on a common hub. In such an embodiment, the resistance provided by the lawn is spread out across twice as many cutting blades. In addition, each blade cuts approximately half as much grass as in the standard single blade mower, thus slowing the blade wear. These multiple blade designs can be more effective at cutting grass when the grass is wet, tall, or thick.

There are also disadvantages associated with using a mounting hub, however. First, mounting hubs take up space on the blade mounting shaft. Some shafts may not be long enough to accommodate the combination of two cutting blades, a mounting hub, and clamping collar. Also, many prior art hub designs can lose clamping force over time, allowing the blades to tilt or otherwise come out of alignment. Hubbed designs also tend to result in a flywheel effect—owing to the increase in rotational mass—which can cause the blades to bend when the blades strike a rock, ant hill, or root.

Thus, it would be desirable to provide an improved lawn mower blade assembly capable of realizing the advantages of multiple blade designs while avoiding the disadvantages associated with the use of a mounting hub.

BRIEF SUMMARY OF THE INVENTION

The present invention is a cutting blade assembly incorporating two lawnmower cutting blades and a holder configured to hold the lawnmower cutting blades in perpendicular orientation with respect to each other. The holder does not occupy any space on the lawnmower blade mounting shaft and results in less rotational inertia than conventional mounting hub designs.

REFERENCE NUMERALS IN THE DRAWINGS

| 10 | holder | 12 | top support member |
|---|---|---|---|
| 14 | bottom support member | 16 | spacer |
| 18 | top cutting blade | 20 | bottom cutting blade |
| 22 | mounting bore | 24 | mating edge |
| 26 | mating edge | 28 | mounting shaft |
| 30 | boss | 32 | collar |
| 34 | arcuate relief | | |

DETAILED DESCRIPTION OF THE INVENTION

Figure 1:
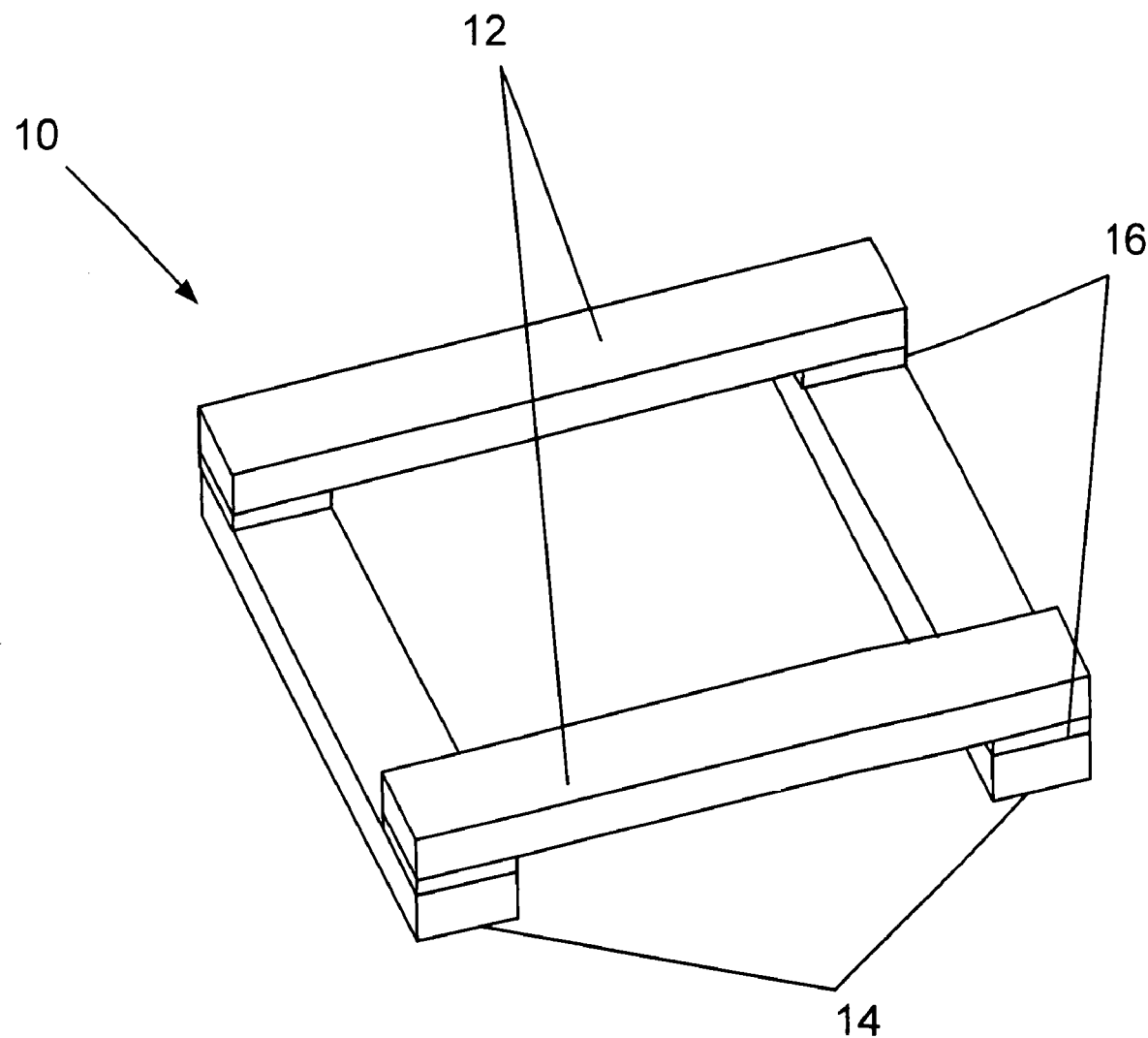
FIG. 1 is a perspective view, showing a holder.

The present invention, holder 10, which may be used to stabilize a pair of cutting blades on a lawnmower blade mounting shaft, is illustrated in FIG. 1. Holder 10 includes a pair of top support member 12 which are attached at their ends to a pair of bottom support members 14 at their ends. Spacers 16 are provided at each corner so that the bottom surfaces of top support members 12 are vertically offset relative to the top surfaces of bottom support members 14. Although top support members 12, bottom support members 14, spacers 16 are shown as discrete components in FIG. 1, holder 10 may be cast or milled as a single, integrated component. It is preferred that holder 10 be constructed of a durable metal alloy.

Figure 2:
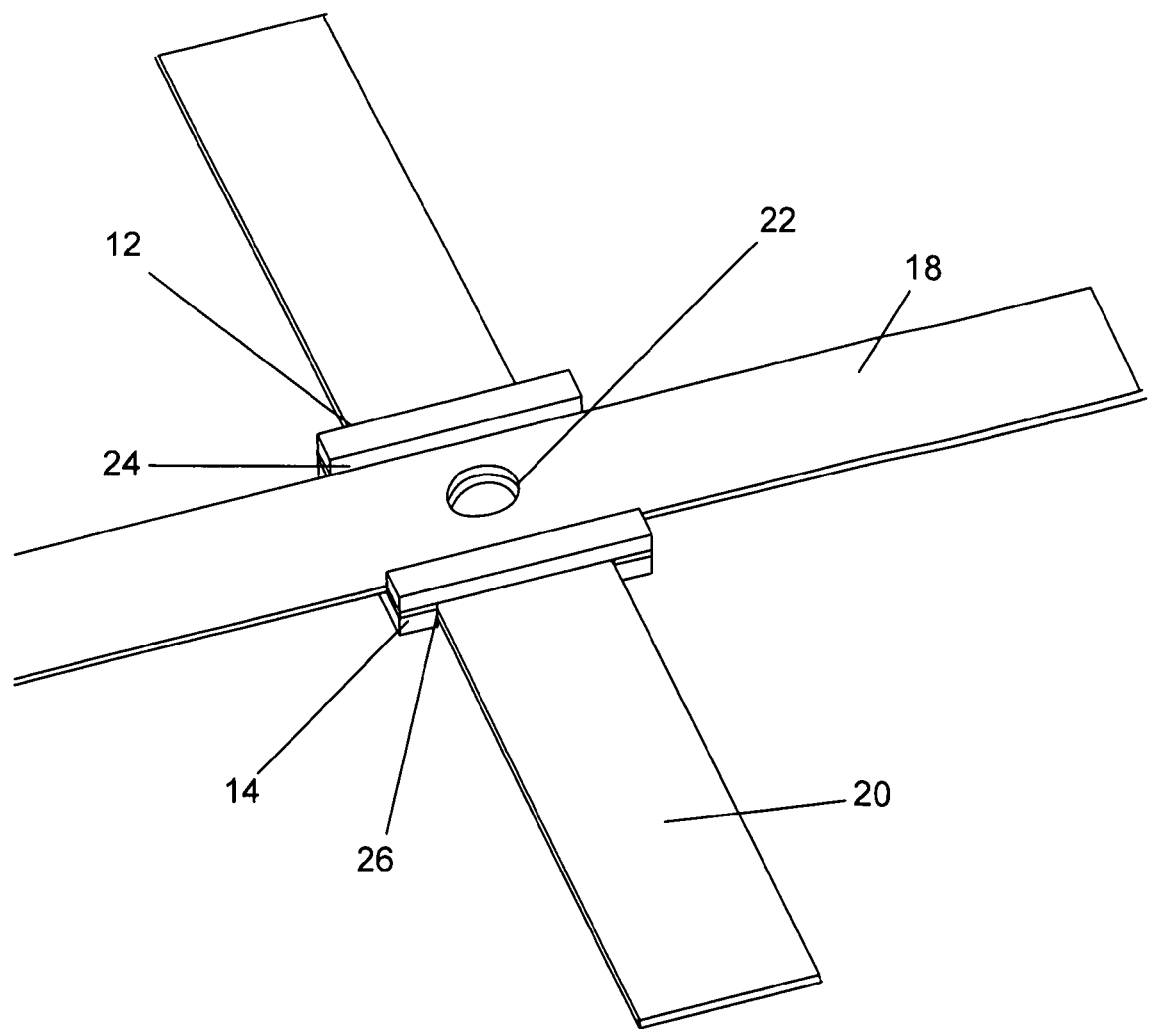
FIG. 2 is a perspective view, showing a cutting blade assembly.

A blade assembly employing holder 10 is illustrated in FIG. 2. Holder 10 is actually sandwiched between top cutting blade 18 and bottom cutting blade 20 when assembled as shown. Top cutting blade 18 and bottom cutting blade 20 are positioned such that mounting bores 22 are aligned. Bottom cutting blade 20 is positioned between bottom support members 14 such that the edge of bottom cutting blade 20 mates with mating edge 26. Top cutting blade 18 is positioned between top support members 12 such that the edge of top cutting blade 18 mates with mating edge 24.

Figure 3:
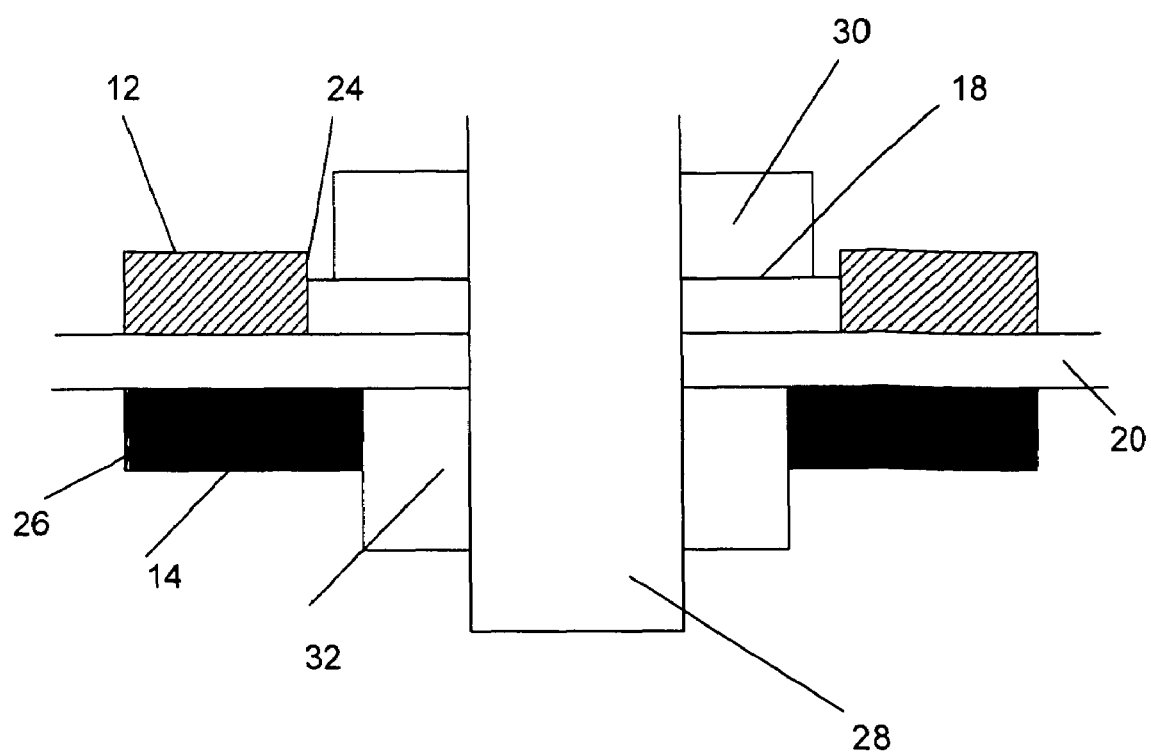
FIG. 3 is a section view, showing the cutting blade assembly attached to a mounting shaft.

Turning to FIG. 3, the assembly is shown attached to the shaft of a lawnmower. The assembly shown in FIG. 2 is attached to mounting shaft 28 of a lawnmower by the clamping force of boss 30 and collar 32. In many applications, mounting shaft 28 contains male threading which engages female threading on collar 32. Thus, after placing the blade assembly on mounting shaft 28, the user would rotate collar 32 about mounting shaft 28 until the cutting blades and holder are tightly clamped between collar 32 and boss 30. When clamped, the bottom surface of top cutting blade 18 mates with the top surface of bottom cutting blade 20 and the top surfaces of bottom support members 14. In addition to mating with the bottom surface of top cutting blade 18, the top surface of bottom cutting blade 20 also mates with the bottom surfaces of top support members 12. As mentioned previously the edge of top cutting blade 18 mates with mating edge 24 of top support member 12. The edge of bottom cutting blade 20 mates with mating edge 26 of bottom support member 14.

The reader should now appreciate that holder 10 holds top cutting blade 18 and bottom cutting blade 20 at perpendicular orientation with respect to each other. When the components are tightly attached to mounting shaft 28, the contacting surfaces of bottom cutting blade 20, top cutting blade 18, top support members 12, and bottom support members 14 reduce the stress exerted on the corners of holder 10 when one of the cutting blades strikes a hard object. The reader will also appreciate that, unlike hub-type blade assemblies, holder 10 does not occupy any space on mounting shaft 28.

Figure 4:
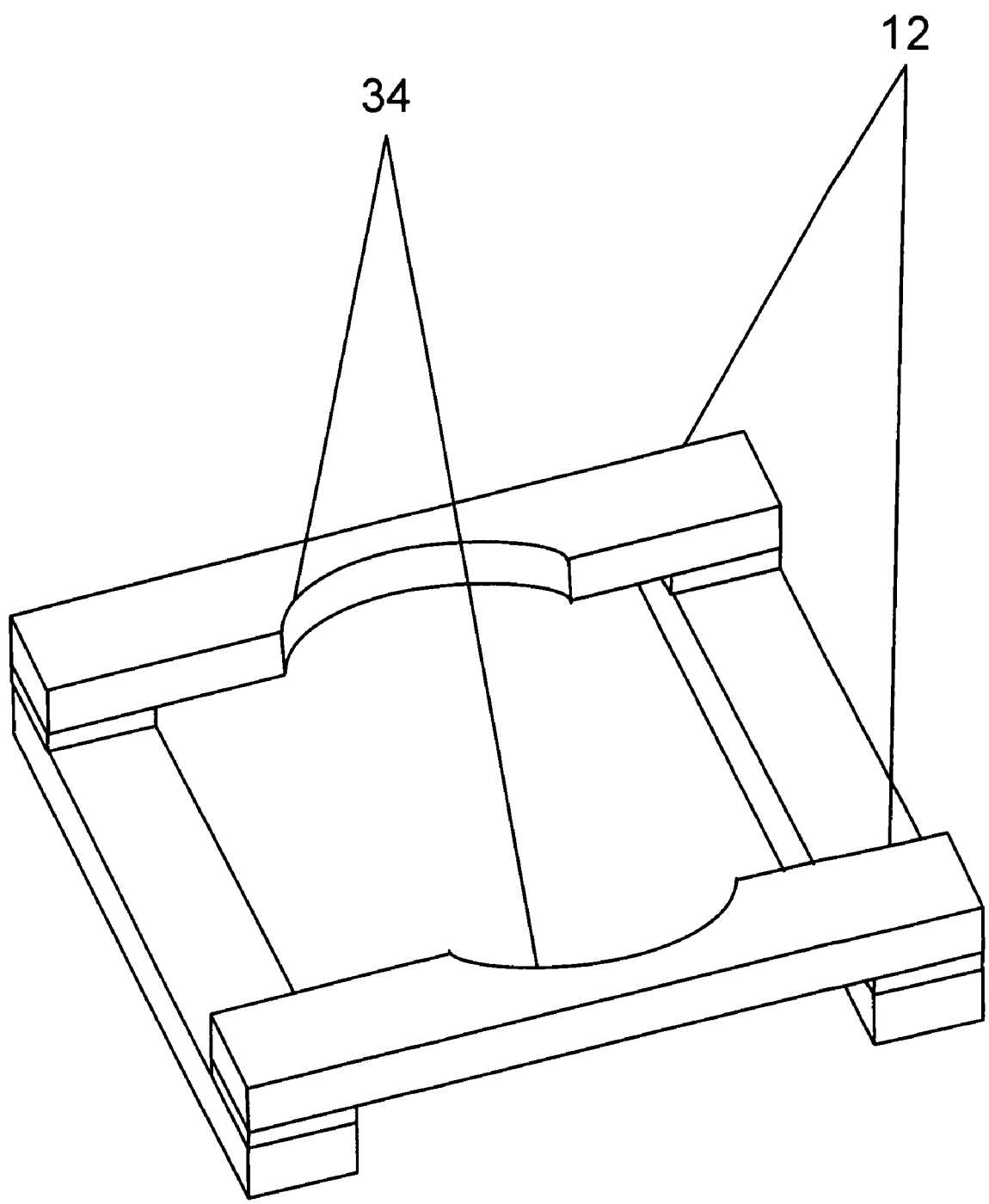
FIG. 4 is a perspective view, showing a holder.

An alternate embodiment of the present invention is shown in FIG. 4. In this embodiment, arcuate relief 34 is provided on each top support member 12. This feature provides for greater clearance where a lawnmower employs a larger boss than the example shown in FIG. 3.

The preceding description contains significant detail regarding the novel aspects of the present invention. It should not be construed, however, as limiting the scope of the invention but rather as providing illustrations of the preferred embodiments of the invention. Thus, the scope of the invention should be fixed by the following claims, rather than by the examples given.

Having described my invention, I claim:

1. An assembly for attachment to the blade mounting shaft of a lawnmower, said blade mounting shaft having a downward facing boss and an adjustable collar positioned to clamp toward said downward facing boss, comprising:
   a. a top cutting blade, having a first edge, a second edge, a bottom surface, and a mounting bore passing through said top cutting blade in said bottom surface between said first edge and said second edge;
   b. a bottom cutting blade, having a first edge, a second edge, a top surface, a bottom surface, and a mounting bore passing through said bottom cutting blade in said top surface between said first edge and said second edge;
   c. a holder having
      i. a first top support member, having a first end, a second end, and a mating edge extending therebetween;
      ii. a second top support member, having a first end, a second end, and a mating edge extending therebetween;
      iii. a first bottom support member, having a first end, a second end, and a mating edge extending therebetween;
      iv. a second bottom support member having a first end, a second end, and a mating edge extending therebetween;
   d. wherein said first top support member is attached on top of said first bottom support member and said second bottom support member such that said first end of said first top support member is proximate said first end of said first bottom support member and said second end of said first top support member is proximate said second end of said second bottom support member, wherein said second top support member is attached on top of said first bottom support member and said second bottom support member such that said first end of said second top support member is proximate said first end of said second bottom support member and said second end of said second top support member is proximate said second end of said first bottom support member;
   e. wherein said holder has an internal passage passing vertically therethrough which is large enough to accommodate said mounting shaft, said downward facing boss, and said adjustable collar, without said mounting shaft, said downward facing boss, and said adjustable collar contacting said holder;
   f. wherein said top cutting blade lies between said first top support member and said second top support member and said bottom cutting blade lies between said first bottom support member and said second bottom support member, said mating edge of said first top support member mates with the first edge of said top cutting blade, said mating edge of said second top support member mates with said second edge of said top cutting blade, said mating edge of said first bottom support member mates with the first edge of said bottom cutting blade, and said mating edge of said second bottom support member mates with said second edge of said bottom cutting blade;
   g. wherein said first top support member has a downward facing surface bearing against said top surface of said bottom cutting blade;
   h. wherein said second top support member has a downward facing surface bearing against said top surface of said bottom cutting blade;
   i. wherein said first bottom support member has an upward facing surface bearing against said bottom surface of said top cutting blade;
   j. wherein said second bottom support member has an upward facing surface bearing against said bottom surface of said top cutting blade;
   k. wherein said top surface of said top cutting blade bears against said downward facing boss;
   l. wherein said top surface of said bottom cutting blade bears against said bottom surface of said top cutting blade;
   m. wherein said adjustable collar bears against said bottom surface of said bottom cutting blade, thereby clamping said bottom cutting blade and said top cutting blade against said boss.

2. The assembly of claim 1, wherein said holder maintains said top cutting blade at a perpendicular orientation with respect to said bottom cutting blade.

3. The assembly of claim 1 wherein said downward facing surfaces of said first and second top support members are vertically offset from said upward facing surfaces of said first and second bottom support members.

4. An assembly for attachment to the blade mounting shaft of a lawnmower, said blade mounting shaft having a downward facing boss and an adjustable collar positioned to clamp toward said downward facing boss, comprising:
   a. a top cutting blade, having a first edge, a second edge, a bottom surface, and a mounting bore passing through said top cutting blade in said bottom surface between said first edge and said second edge;
   b. a bottom cutting blade, having a first edge, a second edge, a top surface, a bottom surface, and a mounting bore passing through said bottom cutting blade in said top surface between said first edge and said second edge;
   c. a holder having a first top support member, a second top support member, a first bottom support member, a second bottom support member;
   d. wherein said first top support member mates with said first edge of said top cutting blade, said second top support member mates with said second edge of said top cutting blade, said first bottom support member mates with said first edge of said bottom cutting blade, said second bottom support member mates with said second edge of said bottom cutting blade and said bottom surface of said top cutting blade mates with said top surface of said bottom cutting blade when assembled;

e. wherein said holder has an internal passage passing vertically therethrough which is large enough to accommodate said mounting shaft, said downward facing boss, and said adjustable collar, without said mounting shaft, said downward facing boss, and said adjustable collar contacting said holder;

f. wherein said first top support member has a downward facing surface bearing against said top surface of said bottom cutting blade;

g. wherein said second top support member has a downward facing surface bearing against said top surface of said bottom cutting blade;

h. wherein said first bottom support member has an upward facing surface bearing against said bottom surface of said top cutting blade; and i. wherein said second first bottom support member has an upward facing surface bearing against said bottom surface of said top cutting blade.

5. The assembly of claim 4, wherein said holder maintains said top cutting blade at a perpendicular orientation with respect to said bottom cutting blade.

6. The assembly of claim 4, wherein said top cutting blade, said bottom cutting blade, and said holder are held together by a clamping force.

7. The assembly of claim 4, wherein said downward facing surfaces of said first and second top support members are vertically offset from said upward facing surfaces of said first and second bottom support members.

8. A holder for a lawnmower blade assembly configured to stabilize a top cutting blade and a bottom cutting blade on a blade mounting shaft of a lawnmower, said blade mounting shaft having a downward facing boss and an adjustable collar positioned to clamp toward said downward facing boss, said top cutting blade having a first edge, a second edge, a bottom surface, and a mounting bore passing through said top cutting blade in said bottom surface between said first edge and said second edge, said bottom cutting blade having a first edge, a second edge, a top surface, and a mounting bore passing through said bottom cutting blade in said top surface between said first edge and said second edge, comprising:

a. a first top support member having a first end, a second end, a downward facing surface between said first end and said second end, and a side mating edge extending between said first end and said second end;

b. a second top support member having a first end, a second end, a downward facing surface between said first end and said second end, and a side mating edge extending between said first end and said second end;

c. a first bottom support member having a first end, a second end, an upward surface between said first end and said second end, and a side mating edge extending between said first end and said second end;

d. a second bottom support member having a first end, a second end, an upward facing surface between said first end and said second end, and a side mating edge extending between said first end and said second end;

e. wherein said first top support member is attached on top of said first bottom support member and said second bottom support member such that said first end of said first top support member is proximate said first end of said first bottom support member and said second end of said first top support member is proximate said second end of said second bottom support member, wherein said second top support member is attached on top of said first bottom support member and said second bottom support member such that said first end of said second top support member is proximate said first end of said second bottom support member and said second end of said second top support member is proximate said second end of said first bottom support member;

f. wherein said holder has an internal passage passing vertically therethrough which is large enough to accommodate said mounting shaft, said downward facing boss, and said adjustable collar, without said mounting shaft, said downward facing boss, and said adjustable collar contacting said holder;

g. wherein said top cutting blade is placed between said first top support member and said second top support member and said second cutting blade is placed between said first bottom support member and said second bottom support member, said mating edge of said first top support member mating with the first edge of said top cutting blade, said mating edge of said second top support member mating with said second edge of said top cutting blade, said mating edge of said first bottom support member mating with the first edge of said bottom cutting blade, said mating edge of said second bottom support member mating with said second edge of said bottom cutting blade, and said bottom surface of said top cutting blade mating with said top surface of said bottom cutting blade;

h. wherein said first top support member has a downward facing surface bearing against said top surface of said bottom cutting blade;

i. wherein said second top support member has a downward facing surface bearing against said top surface of said bottom cutting blade;

j. wherein said first bottom support member has an upward facing surface bearing against said bottom surface of said top cutting blade; and k. wherein said second first bottom support member has an upward facing surface bearing against said bottom surface of said top cutting blade.

9. The assembly of claim 8, wherein said downward facing surfaces of said first and second top support members are vertically offset from said upward facing surfaces of said first and second bottom support members.

* * * * *